US008105508B2

(12) United States Patent  
Levasseur et al.

(10) Patent No.: US 8,105,508 B2  
(45) Date of Patent: Jan. 31, 2012

(54) SYNTHESIS OF CRYSTALLINE NANOMETRIC LIFEMPO$_4$

(75) Inventors: Stéphane Levasseur, Brussels (BE); Michèle Van Thournout, Ellezelles (BE); Pierre Gibot, Amiens (FR); Christian Masquelier, Boves (FR)

(73) Assignees: Umicore, Brussels (BE); Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 12/825,682

(22) Filed: Jun. 29, 2010

(65) Prior Publication Data

US 2010/0327222 A1    Dec. 30, 2010

Related U.S. Application Data

(62) Division of application No. 12/519,853, filed as application No. PCT/EP2007/009969 on Nov. 19, 2007.

(60) Provisional application No. 60/881,509, filed on Jan. 22, 2007.

(30) Foreign Application Priority Data

Dec. 22, 2006   (EP) .................................... 06292048

(51) Int. Cl.  
*H01B 1/08* (2006.01)

(52) U.S. Cl. ................. 252/521.5; 252/521.2; 429/218.1

(58) Field of Classification Search ............... 252/521.2, 252/521.5; 429/218.1, 224; 423/306  
See application file for complete search history.

(56) References Cited

U.S. PATENT DOCUMENTS

| 5,910,382 | A  | 6/1999  | Goodenough et al. |
| 6,749,967 | B2 | 6/2004  | Li et al. |
| 7,390,472 | B1 | 6/2008  | Singhal et al. |
| 2008/0241690 | A1 | 10/2008 | Delacourt et al. |
| 2010/0086852 | A1 | 4/2010  | Gibot et al. |

FOREIGN PATENT DOCUMENTS

| JP | 2004-079276 |   | 3/2004 |
| JP | 2004259470 | * | 9/2004 |
| KR | 2006/025842 |   | 3/2006 |
| WO | WO 02/083555 |   | 10/2002 |
| WO | WO 02/099913 |   | 12/2002 |
| WO | WO 04/001881 |   | 12/2003 |
| WO | WO 2005/051840 |   | 6/2005 |
| WO | WO 2006/105848 |   | 10/2006 |
| WO | WO 2008/018633 |   | 2/2008 |

OTHER PUBLICATIONS

English translation of JP2004-079276 (pub Mar. 2004).*  
European Search Report, issued in EP 06292048.3, dated Apr. 25, 2007.  
International Preliminary Report on Patentability, issued in PCT/EP2007/009969, dated Jul. 2, 2009.

(Continued)

*Primary Examiner* — Mark Kopec  
(74) *Attorney, Agent, or Firm* — Brinks Hofer Gilson & Lione (57) ABSTRACT

The present invention relates to crystalline nanometric olivine-type LiFe$_{1-x}$Mn$_x$PO$_4$ powder with 0<x<1, with small particle size and narrow particle size distribution. The fine particle size is believed to account for excellent high-drain properties, while minimizing the need for conductive additives. The narrow distribution facilitates the electrode manufacturing process and ensures a homogeneous current distribution within the battery.

6 Claims, 6 Drawing Sheets

OTHER PUBLICATIONS

International Search Report, issued in PCT/EP2007/009969, dated Mar. 26, 2008.

Ma et al., "Electrochemical Performance of Nanocrystalline $LiMPO_4$ Thin-Films Prepared by Electrostatic Spray Deposition," Journal of Power Sources, vol. 148, (2005), pp. 66-71.

Wang et al., "Extraction of Layerwise Conductivities in Carbon-Enhanced, Multilayered $LiFePO_4$ Cathodes," Journal of the Electrochemical Society, vol. 152, No. 5, (2005), pp. A1001-A1010.

Lloris et al., "Improvement of the Electrochemical Performance of $LiCoPO_4$ 5 V Material Using a Novel Synthesis Procedure," Electrochemical and Solid-State Letters, vol. 5, No. 10, (2002), A234-A237.

Mi et al., "Synthesis and Performance of $LiMn_{0.6}Fe_{0.4}PO_4$/Nano-Carbon Webs Composite Cathode," Materials Science and Engineering, vol. B, No. 129, (2006), pp. 8-13.

Striebel et al., "Comparison of $LiFePO_4$ from Different Sources," Journal of the Electrochemical Society, vol. 152, No. 4, (2005), pp. A664-A670.

Amine et al., "Olivine $LiCoPO_4$ as 4.8 V Electrode Material for Lithium Batteries," Electrochemical and Solid-State Letters, vol. 3, No. 4, (2000), pp. 178-179.

Arnold et al., "Fine-Particle Lithium Iron Phosphate $LiFePO_4$ Synthesized by a New Low-Cost Aqueous Precipitation Technique," Journal of Power Sources, vol. 119-121, (2003), pp. 247-251, Search Report.

Delacourt et al., "One-Step Low-Temperature Route for the Preparation of Electrochemically Active $LiMnPO_4$ Powders," Chem. Mater., vol. 16, (2004), pp. 93-99, Search Report.

Delacourt et al., "Low Temperature Preparation of Optimized Phosphates for Li-Battery Applications," Solid State Ionics, vol. 173, (2004), pp. 113-118, Search Report.

Kwon et al., "Enhanced Electrochemical Performance of Mesoparticulate $LiMnPO_4$ for Lithium Ion Batteries," Electrochemical and Solid-State Letters, vol. 9, No. 6, (2006), pp. A277-A280.

Li et al., "$LiMnPO_4$ as the Cathode for Lithium Batteries," Electrochemical and Solid-State Letters, vol. 5, No. 6, (2002), pp. A135-A137.

Chen et al., "Reducing Carbon in $LiFePO_4$/C Composite Electrodes to Maximize Specific Energy, Volumetric Energy, and Tap Density," Journal of the Electrochemical Society, vol. 149, No. 9, (2002), pp. A1184-A1189.

Delacourt et al., "Toward Understanding of Electrical Limitations (Electronic, Ionic) in $LiMPO_4$ (M=Fe, Mn) Electrode Materials," Journal of the Electrochemical Society, vol. 152, No. 5, (2005), pp. A913-A921.

Okada et al., "Cathode Properties of Phospho-Olivine $LiMPO_4$ for Lithium Secondary Batteries," Journal of Power Sources, vol. 97-98, (2001), pp. 430-432.

Franger et al., "Comparison Between Different $LiFePO_4$ Synthesis Routes and Their Influence on its Physico-Chemical Properties," Journal of Power Sources, vol. 119-121, (2003), pp. 252-257, Search Report.

Padhi et al., "Phospho-Olivines as Positive-Electrode Materials for Rechargeable Lithium Batteries," J. Electrochem. Soc., vol. 144, No. 4, (Apr. 1997), pp. 1188-1194.

Yonemura et al., "Comparative Kinetic Study of Olivine $Li_xMPO_4$ (M=Fe, Mn)," Journal of the Electrochemical Society, vol. 151, No. 9, (2004), pp. A1352-A1356.

Nuspl et al., "Ultrafine $LiFePO_4$ Synthesized by an Optimized Hydrothermal Process," Abs. 293, IMLB 12 Meeting, (2004).

* cited by examiner

SYNTHESIS OF CRYSTALLINE NANOMETRIC LIFEMPO$_4$

This application is a divisional application of U.S. application Ser. No. 12/519,853, filed Sep. 30, 2009, which is a national stage application of International Application No. PCT/EP2007/009969, filed Nov. 19, 2007, which claims priority to European Patent Application No. 06292048.3, filed Dec. 22, 2006, and U.S. Provisional Patent Application No. 60/881,509, filed Jan. 22, 2007, the entire contents of which are hereby incorporated by reference.

The invention relates to a crystalline nanometric LiFe$_{1-x}$M$_x$PO$_4$ (LFMP) powder with small particle size and narrow particle size distribution for use as positive electrode material in Li batteries. It also describes a preferred manufacturing method by precipitation at low temperature and atmospheric pressure of the crystalline nanometric powder.

Since the original work of Padhi et al. (JES, 144 (1997), 1188), phospho-olivines LiMPO$_4$ (with M=Fe, Ni, Co, Mn, ...) have appeared to be potential candidates to be used as cathode materials for Li batteries. Among all these isostructural compositions, LiFePO$_4$ was the most investigated and its commercialization is now a reality thanks to very high performances in term of reversible capacity, rate properties and cycle life (International Publication Number WO2004/001881 A2).

LiCoPO$_4$ (Amine et al., ESSL, 3, (2000), 178) and LiMnPO$_4$ (Okada et al., J. Power Sources, 97-98 (2001) 430), due to their higher redox potential values oft 4.8 V and 4.1 V vs. Li respect, are of particular interest because of the higher energy density they offer compared to LiFePO$_4$ (3.5V vs. Li, Chen et al., JES, 149 (2002) A1184).

However, it is now well known that these phospho-olivines materials suffer from poor electronic and ionic conductivity (Delacourt et al., JES, 152 (2005) A913) so that the need for optimising the microstructure of these compounds is essential. Striebel et al. (JES, 152, (2005), A664) insisted on the fact that, even if the matrix conductivity has been improved by conductive coating, the battery developer would welcome so-far inexistent compounds having a primary particle size in the 50 to 100 nm range and, overall, attempts should be made to minimise the particle size distribution, in order to yield better power efficiency.

Most promising results on mixed metal phosphates such as LiFe$_{1-x}$Mn$_x$PO$_4$ materials were obtained on C/LiFe$_{0.4}$Mn$_{0.6}$PO$_4$ composites, in which C acts as a sintering inhibitor. This approach leads to mixed C/LiFeMnPO$_4$ composites with particles in the 100 to 200 nm range (Mi et al., Mater. Sci. Eng., 129 (2006) 8). Similar results were obtained by Lloris et al. (ESSL, 5 (2002) A234), on pure LiCoPO$_4$ with small particles in the 200 to 300 nm range. No data were published on LiFe$_{1-x}$CO$_x$PO$_4$ materials so far.

In addition to the small particle size, emphasis must be put on narrowing the particle size distribution in order to ensure a homogeneous current distribution in the electrode and thus achieve better battery performances, in particular high power efficiency and long cycle life. The present invention therefore aims at providing a crystalline LFMP powder with small particle size and narrow particle size distribution.

To this end, a process is disclosed yielding metal phosphate powders offering essential improvements over the materials cited above.

The invented process for the synthesis of crystalline LiFe$_{1-x}$M$_x$PO$_4$ powder where M is one or both of Co and Mn, and 0<x<1, preferably 0.4<x<0.95, comprises the steps of:

providing a water-based mixture having a pH between 6 and 10, containing a dipolar aprotic additive, and Li$^{(I)}$, Fe$^{(II)}$, P$^{(V)}$, and one or both of Co$^{(II)}$ and Mn$^{(II)}$ as precursor components;

heating said water-based mixture to a temperature less than or equal to its boiling point at atmospheric pressure, thereby precipitating crystalline LiFe$_{1-x}$M$_x$PO$_4$ powder. The obtained powder can be subjected to a post-treatment by heating it in non-oxidising conditions.

A pH of between 6 and 8 is however preferred to avoid any precipitation of Li$_3$PO$_4$. The additive is preferably a dipolar aprotic compound without chelating or complexation propensity. The heating temperature of the water-based mixture of at least 60° C. is preferred.

The production of the crystalline LiFe$_{1-x}$M$_x$PO$_4$ powder or the thermal post-treatment can advantageously be performed in the presence of at least one further component, in particular a carbon containing or electron conducting substance, or the precursor of an electron conducting substance.

It is useful to introduce at least part of the Li$^{(I)}$ is as LiOH. Similarly, at least part of the P$^{(V)}$ can be introduced as H$_3$PO$_4$. The pH of the water-based mixture can be obtained by adjusting the ratio of LiOH to H$_3$PO$_4$.

It is advisable to use a water-based mixture with an atmospheric boiling point of between 100 and 150° C., and preferably between 100 and 120° C. Dimethylsulfoxide (DMSO) is preferably used as the dipolar aprotic additive. The water-based mixture advantageously contains between 5 and 50% mol, and preferably between 10 and 30% mol, of DMSO. A lower DMSO concentrations result in a coarser particle size distribution; higher concentrations limit the availability of water, forcing to increase the volume of the apparatus.

The step of post treatment of the LiFe$_{1-x}$M$_x$PO$_4$ is advantageously performed at a temperature of up to 675° C., and preferably of at least 300° C. The lower limit is chosen in order to enhance the crystallinity of the precipitated LiFe$_{1-x}$M$_x$PO$_4$; the upper limit is chosen so as to avoid the decomposition of the LiFe$_{1-x}$M$_x$PO$_4$ into manganese phosphides.

The electron conducting substance can be carbon, in particular conductive carbon or carbon fibres. Alternatively, a precursor of an electron conducting substance can be used, in particular a polymer or sugar-type macromolecule.

The invention also pertains to a crystalline LiFe$_{1-x}$Mn$_x$PO$_4$ powder with 0<x<1, preferably 0.4<x<0.95, for use as electrode material in a battery, having a particle size distribution with an average particle size d50 of less than 100 nm, and preferably of more than 30 nm. The maximum particle size is preferably less than or equal to 500 nm. The particle size distribution is preferably mono-modal and the ratio (d90–d10)/d50 is advantageously less than 1.5, preferably less than 1.3.

Another embodiment of this invention concerns a composite powder containing the above-defined crystalline LiMnPO$_4$ powder, and up to 10% wt of conductive additive. A further embodiment concerns the electrode mix that can be prepared using this composite powder. Conductive carbons, carbon fibres, amorphous carbons resulting from decomposition of organic carbon containing substances, electron conducting polymers, metallic powders, and metallic fibres are particularly well suited as conductive additives.

Another embodiment of this invention concerns the use of the composite powder for the manufacture of a lithium insertion-type electrode, by mixing said powder with a conductive carbon-bearing additive.

The invention also pertains to a crystalline LiFe$_{1-x}$CO$_x$PO$_4$ powder with 0<x<1, preferably 0.4<x<0.95, for use as electrode material in a battery, having a particle size distribution with an average particle size d50 of less than 300 nm, and preferably of more than 30 nm. The maximum particle size is preferably less than or equal to 900 nm. The particle size distribution is preferably mono-modal and the ratio (d90–d10)/d50 is advantageously less than 1.5, preferably less than 1.1.

Another embodiment of this invention concerns a composite powder containing the above-defined crystalline LiFe$_{1-x}$Co$_x$PO$_4$ powder, and up to 10% wt of conductive additive. A further embodiment concerns the electrode mix that can be prepared using this composite powder. Conductive carbons, carbon fibres, amorphous carbons resulting from decomposition of organic carbon containing substances, electron conducting polymers, metallic powders, and metallic fibres are particularly well suited as conductive additives.

Another embodiment of this invention concerns the use of the composite powder for the manufacture of a lithium insertion-type electrode, by mixing said powder with a conductive carbon-bearing additive.

Compared to prior art, this product lists all the advantages needed for being considered as potential cathode material in lithium battery:
- the direct precipitation of crystalline LFMP at low temperature prevents any grain growth linked to sintering processes. Nanometric particle sizes are obtained. This reduces kinetic limitations due to Li ions transport within the particle, thereby enhancing the fast charge/discharge behaviour of the batteries.
- the narrow particle size distribution ensures a homogeneous current distribution within the battery. This is especially important at high charge/discharge rates, where finer particles would get more depleted than coarser ones, a phenomenon leading to the eventual deterioration of the particles and to the fading of the battery capacity upon use. Furthermore, it facilitates manufacturing of the electrode.

The atmospheric boiling point of the water-based mixture is advisably between 100 and 150° C., preferably between 100 and 120° C. Use is made of a water-miscible additive as a co-solvent that will increase the precipitate nucleation kinetics thus reducing the size of the LiMnPO$_4$ nanometric particles. In addition to be miscible with water, useful co-solvents should be aprotic, i.e. show only a minor or complete absence of dissociation accompanied by release of hydrogen ions. Co-solvents showing complexation or chelating properties such as ethylene glycol do not appear suitable as they will reduce the kinetics of precipitation of LiMnPO$_4$ and thus lead to larger particle sizes. Suitable dipolar aprotic solvents are dioxane, tetrahydrofuran, N—($C_1$-$C_{18}$-alkyl)pyrrolidone, ethylene glycol dimethyl ether, $C_1$-$C_4$-alkylesters of aliphatic $C_1$-$C_6$-carboxylic acids, $C_1$-$C_6$-dialkyl ethers, N,N-di-($C_1$-$C_4$-alkyl)amides of aliphatic $C_1$-$C_4$-carboxylic acids, sulfolane, 1,3-di-($C_1$-$C_8$-alkyl)-2-imidazolidinone, N—($C_1$-$C_8$-alkyl)caprolactam, N,N,N',N'-tetra-($C_1$-$C_8$-alkyl)urea, 1,3-di-($C_1$-$C_8$-alkyl)-3,4,5,6-tetrahydro-2(1H)-pyrimidone, N,N,N',N'-tetra-($C_1$-$C_8$-alkyl)sulfamide, 4-formylmorpholine, 1-formylpiperidine or 1-formylpyrrolidine, N—($C_1$-$C_{18}$-alkyl)pyrrolidone, N-methylpyrrolidone (NMP), N-octylpyrrolidone, N-dodecylpyrrolidone, N,N-dimethylformamide, N,N-dimethylacetamide or hexamethylphosphoramide. Other alternatives such as tetraalkyl ureas are also possible. Mixtures of the abovementioned dipolar aprotic solvents may also be used. In a preferred embodiment, dimethylsulfoxide (DMSO) is used as solvent.

The invention is further illustrated in the following examples.

EXAMPLE 1

Synthesis of LiFe$_{0.5}$Mn$_{0.5}$PO$_4$

In a first step, DMSO is added to an equimolar solution of 0.05 M Mn$^{(II)}$ in MnNO$_3$.4H$_2$O, 0.05 M Fe$^{(II)}$ in FeSO$_4$.7H$_2$O and 0.1 M P$^{(V)}$ in H$_3$PO$_4$, dissolved in H$_2$O while stirring. The amount of DMSO is adjusted in order to reach a global composition of 50% vol water and 50% vol DMSO corresponding to respectively about 80% mol and 20% mol.

In a second step, an aqueous solution of 0.3 M LiOH.H$_2$O is added to the solution at 25° C.; the pH hereby increases to a value between 6.5 and 7.5. The final Li:Fe:Mn:P ratio is close to 3:0.5:0.5:1.

Figure 1:
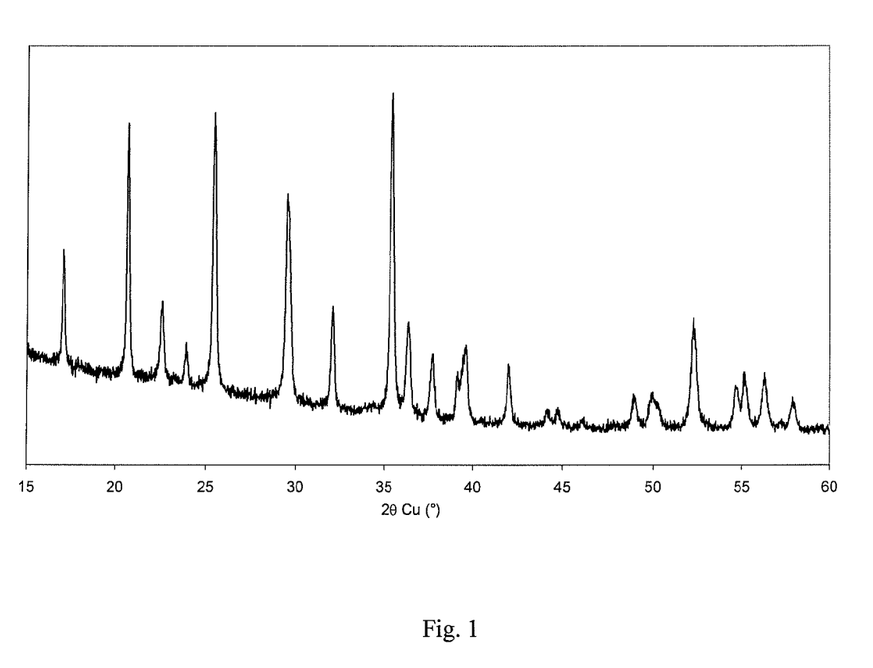
FIG. 1: XRD of the LiFe$_{0.5}$Mn$_{0.5}$PO$_4$ precipitate after 18 h reaction time.

In a third step, the temperature of the solution is increased up to the solvent boiling point, which is 108 to 110° C. After 18 h, the obtained precipitate is filtered and washed thoroughly with water. The pure crystalline LiFe$_{0.5}$Mn$_{0.5}$PO$_4$ obtained is shown in FIG. 1.

The refined cell parameters are a=10.390 Å, b=6.043 Å; c=4.721 Å, with a cell volume of 296.4 Å$^3$. This is in good agreement with Vegard's law specifying that, in case of solid solution, the cell volume of mixed product should be in-between that of end products (291 Å$^3$ for pure LiFePO$_4$, 302 Å$^3$ for pure LiMnPO$_4$).

Figure 2:
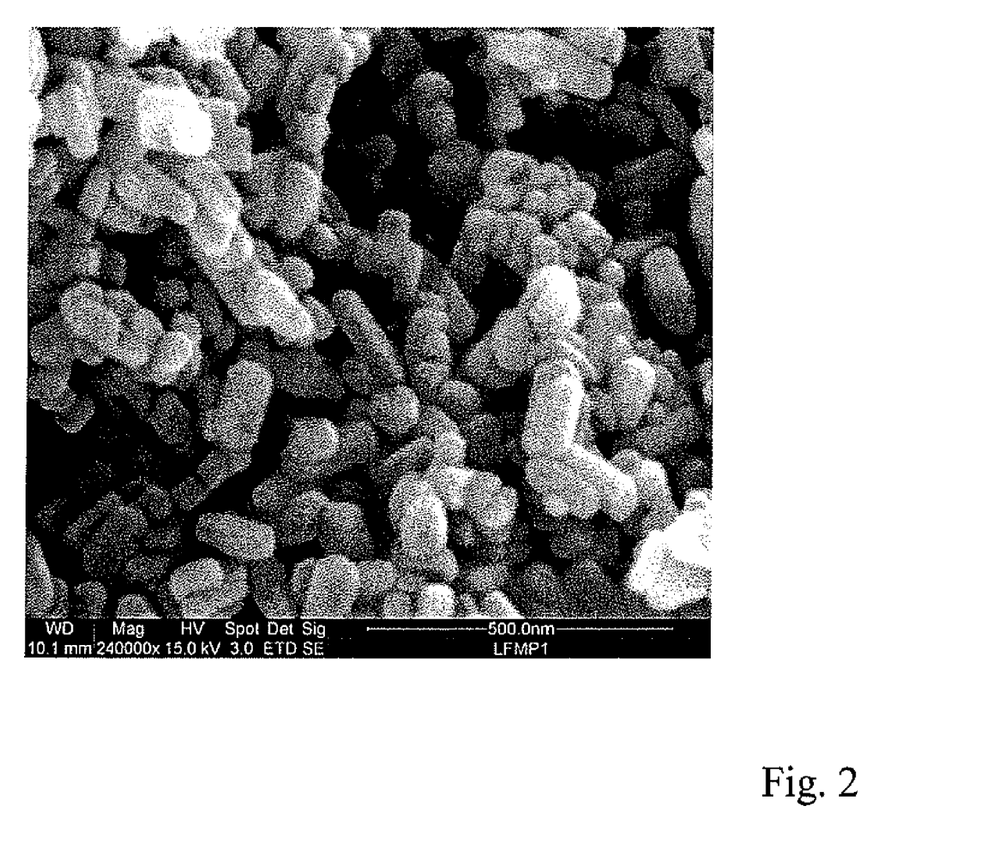
FIG. 2: SEM picture of the LiFe$_{0.5}$Mn$_{0.5}$PO$_4$.
Figure 3:
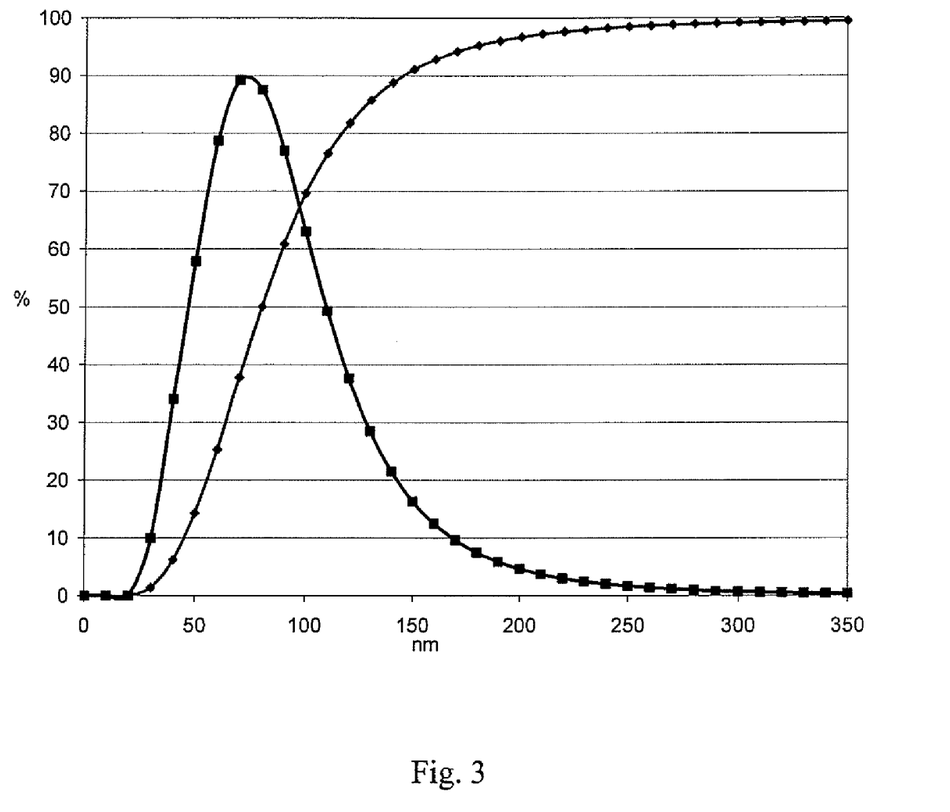
FIG. 3: Volumetric particle size distribution and cumulative distribution (% vs. nm) of the LiFe$_{0.5}$Mn$_{0.5}$PO$_4$.

The picture on FIG. 2 shows monodisperse small crystalline particles in the 50-100 nm range. The volumetric particle size distribution of the product was measured using image analysis. As shown in FIG. 3, the d50 values is about 80 nm, while the relative span, defined as (d90–d10)/d50, is about 1.2 (d10=45 nm, d90=145 nm).

EXAMPLE 2

Synthesis of LiFe$_{0.5}$Co$_{0.5}$PO$_4$

In a first step, DMSO is added to an equimolar solution of 0.05 M Mn$^{(II)}$ in MnSO$_4$.H$_2$O, 0.05 M Co$^{(II)}$ in CoNO$_3$.6H$_2$O and 0.1 M P(V) in H$_3$PO$_4$, dissolved in H$_2$O while stirring. The amount of DMSO is adjusted in order to reach a global composition of 50% vol. water and 50% vol. DMSO.

In a second step, an aqueous solution of 0.3 M LiOH.H$_2$O is added to the solution at 25° C.; the pH hereby increases to a value between 6.5 and 7.5. The, the final Li:Fe:Co:P ratio is close to 3:0.5:0.5:1.

Figure 4:
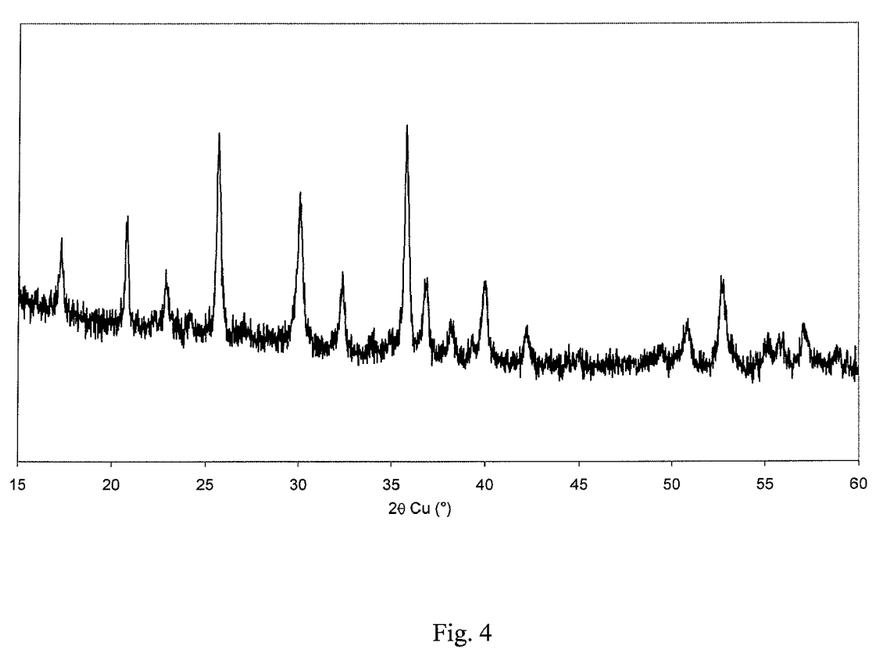
FIG. 4: XRD of the LiFe$_{0.5}$Co$_{0.5}$PO$_4$ precipitate after 18 h reaction time.

In a third step, the temperature of the solution is increased up to the solvent boiling point, which is 108 to 110° C. After 18 h, the obtained precipitate is filtered and washed thoroughly with water. The pure crystalline LiFe$_{0.5}$Co$_{0.5}$PO$_4$ obtained is shown in FIG. 4.

The refined cell parameters are a=10.292 Å, b=5.947 Å; c=4.712 Å with a cell volume of 288.4 Å$^3$. This is again in good agreement with Vegard's law specifying that, in case of solid solution, the cell volume of mixed product should be in-between that of end products (291 Å$^3$ for pure LiFePO$_4$, 284 Å$^3$ for pure LiCoPO$_4$).

Figure 5:
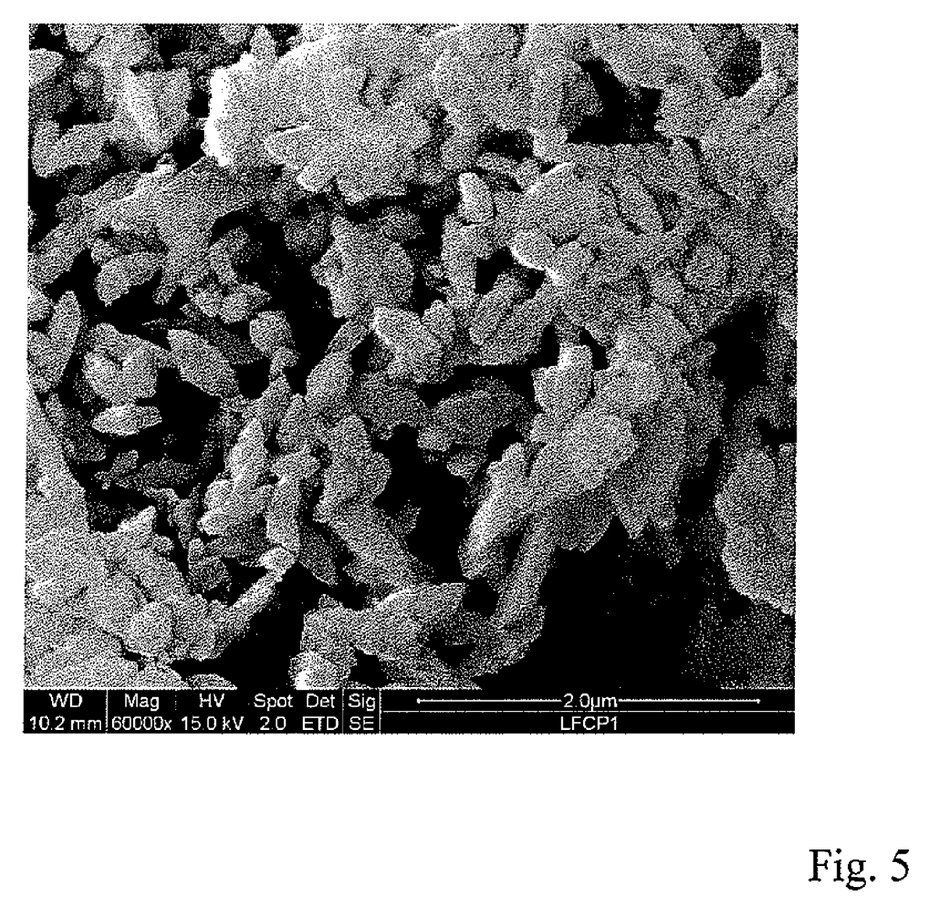
FIG. 5: SEM picture of the LiFe$_{0.5}$Co$_{0.5}$PO$_4$.
Figure 6:
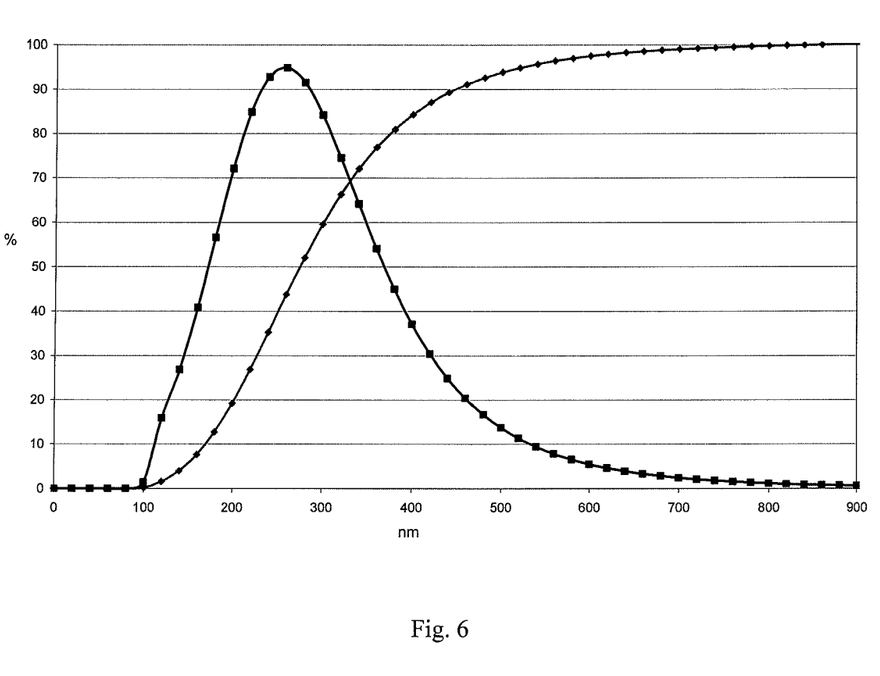
FIG. 6: Volumetric particle size distribution and cumulative distribution (% vs. nm) of the LiFe$_{0.5}$Co$_{0.5}$PO$_4$.

The picture on FIG. 5 shows monodisperse small crystalline particles in the 200-300 nm range. The volumetric particle size distribution of the product was measured by using image analysis. As shown in FIG. 6, the d50 values is about 275 nm, while the relative span, defined as (d90−d10)/d50, is about 1.0 (d10=170 nm, d90=450 nm).

The invention claimed is:

1. A crystalline LiFe$_{1-x}$Mn$_x$PO$_4$ powder with 0<x<1, for use as electrode material in a battery, having a particle size distribution between 50-100 nm, with a ratio (d90−d10)/d50 of less than 1.5, wherein the powder does not include a conductive carbon coating.

2. The LiFe$_{1-x}$Mn$_x$PO$_4$ powder of claim 1, wherein the maximum particle size is less than or equal to 100 nm.

3. The LiFe$_{1-x}$Mn$_x$PO$_4$ powder of claim 1, wherein the particle size distribution is mono-modal.

4. The crystalline LiFe$_{1-x}$Mn$_x$PO$_4$ powder of claim 3, wherein the particle size distribution is mono-modal and the ratio (d90−d10)/d50 is less than 1.3.

5. The crystalline LiFe$_{1-x}$Mn$_x$PO$_4$ powder of claim 1, having a particle size distribution with average particle side d50 between 60-90 nm.

6. An electrode mix containing the composite powder of claim 1.

* * * * *

UNITED STATES PATENT AND TRADEMARK OFFICE
CERTIFICATE OF CORRECTION

PATENT NO. : 8,105,508 B2  
APPLICATION NO. : 12/825682  
DATED : January 31, 2012  
INVENTOR(S) : Stephane Levasseur et al.

Page 1 of 1

It is certified that error appears in the above-identified patent and that said Letters Patent is hereby corrected as shown below:

In the Title (Item 54) of the subject patent, please delete "LIFEMPO.sub.4" and insert in place thereof --LiFeMPO.sub.4--;

In column 1, line 2, please delete "LIFEMPO.sub.4" and insert in place thereof --LiFeMPO.sub.4--;

In column 6, line 9, please delete "side" and insert in place thereof --size--.

Signed and Sealed this  
Fifteenth Day of May, 2012

David J. Kappos  
*Director of the United States Patent and Trademark Office*